(12) United States Patent
Guillez et al.

(10) Patent No.: US 7,290,825 B2
(45) Date of Patent: Nov. 6, 2007

(54) DEVICE USED TO FACILITATE THE INSERTION OF OBJECTS UNDER A FOLDED ROOF IN THE BOOT OF A MOTOR VEHICLE

(75) Inventors: Jean-Marc Guillez, Cirieres (FR); Paul Queveau, Montravers (FR); Gérard Queveau, Le Pin (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 0 days.

(21) Appl. No.: 10/521,890

(22) PCT Filed: Jun. 26, 2003

(86) PCT No.: PCT/FR03/01981

§ 371 (c)(1),
(2), (4) Date: Sep. 15, 2005

(87) PCT Pub. No.: WO2004/009387

PCT Pub. Date: Jan. 29, 2004

(65) Prior Publication Data

US 2006/0145509 A1    Jul. 6, 2006

(30) Foreign Application Priority Data

Jul. 19, 2002    (FR)    .................................. 02 09217

(51) Int. Cl.
*B60J 7/14*    (2006.01)
*B60J 7/185*   (2006.01)

(52) U.S. Cl. ................... 296/108; 296/128; 296/107.08
(58) Field of Classification Search ................ 296/108, 296/124, 128, 131, 132, 107.08
See application file for complete search history.

(56) References Cited

U.S. PATENT DOCUMENTS

| 1,320,333 | A  | * | 10/1919 | McMullin ................... 296/128 |
| 6,786,528 | B2 | * | 9/2004  | Guillez et al. ............... 296/108 |
| 6,832,807 | B2 | * | 12/2004 | Tezuka ........................ 296/128 |

* cited by examiner

*Primary Examiner*—Dennis H. Pedder
(74) *Attorney, Agent, or Firm*—Daphne L. Burton

(57) ABSTRACT

A device used to facilitate the insertion of objects under a folded roof in the boot of a motor vehicle. The roof includes a rear element which is equipped with a finger bar that is designed to slide along a rail comprising a storage section, which is intended to guide the roof between a deployed position and a folded, stored position, and a raised section, which is intended to guide said roof between a folded, stored position and a folded, raised position. The device comprises a raising member which moves the above-mentioned finger along the length of the raised section. Moreover, a locking member is mounted to the raising member between an unlocked position and a locked position in which it blocks the auxiliary roof element in relation to the rear element when the roof is moved toward the folded, raised position thereof.

19 Claims, 9 Drawing Sheets

DEVICE USED TO FACILITATE THE INSERTION OF OBJECTS UNDER A FOLDED ROOF IN THE BOOT OF A MOTOR VEHICLE

CROSS-REFERENCE TO RELATED APPLICATIONS

This application claims priority to French patent application No. 02/09217 filed on or about Jul. 19, 2002. A related application was also filed under the Patent Cooperation Treaty on or about Jun. 26, 2003, as PCT/FR03/01981. The PCT application claims priority to the French patent application.

BACKGROUND OF THE INVENTION

1. Field of the Invention

The invention relates to a device used to facilitate the insertion of objects under a roof which is folded in the boot of a motor vehicle.

2. Description of the Related Art

We know of a device adapted to facilitate the inserting of objects under a folded roof in the rear boot of a motor vehicle, according to which type the roof is movable between a deployed position in which it covers the passenger compartment of the vehicle, and a folded, stored position in which the roof is stored and retracted into the boot, and comprises a rear roof element and at least one additional roof element which is located in front of the rear roof element when the roof is in the deployed position, and above the rear roof element when the roof is in the folded position, the rear roof element comprising a finger bar used to slide along a guiding rail which is fixed to the body of the vehicle and which comprises a storage section used to guide the roof between its deployed position and a folded, stored position, and a raising section extending along the storage section and used to guide the folded roof between its folded, stored position and a folded, raised position in which the folded roof at least partially projects out of the boot, the hood of the boot being in the open position, the device comprising a raising device mounted in a movable manner between a low position and a high position, and used to guide the finger bar along the raising section.

Such a device, disclosed in the French application registered under the number 02 02 484, allows access to the rear boot zone located under the folded roof. Indeed, this zone that can hold suitcases is difficult to access, the rear edge of the rear roof element when folded into the boot being too close to the rear edge of the opening of the boot. The device allows to raise the entire folded roof and thus create greater access to this zone. Of course, the raising of the folded roof can only take place when the rear boot hood is open.

Such a device has a great inconvenience of leaving the additional roof elements with a certain amount of leeway in relation to the rear roof element, the means allowing to articulate roof elements between themselves does not provide sufficient rigidity to the folded roof, which could engender, during the raising of the folded roof, an off-setting of the additional roof elements and putting them off centre.

SUMMARY OF THE INVENTION

The purpose of the invention is to resolve the aforementioned problem by providing a device that avoids any risk of off-setting the additional roof elements (and therefore off-centring) when the folded roof is raised.

According to the invention, a securing means is fitted to the raising device in a movable manner between an open position and a closed position in which the securing means is used to support each additional roof element and to immobilise each additional roof element in relation to the rear roof element, when the roof is guided between its folded, stored position and its folded, raised position.

Such an invention allows to render the rear boot zone located under the folded roof accessible without the additional roof elements being off-set and put off-centre when the folded roof is raised.

BRIEF DESCRIPTION OF THE DRAWINGS

Other features and advantages of the invention will become clear from the following description.

In relation to the non-restrictive drawings given by way of example.

DETAILED DESCRIPTION OF THE INVENTION

Figure 1:
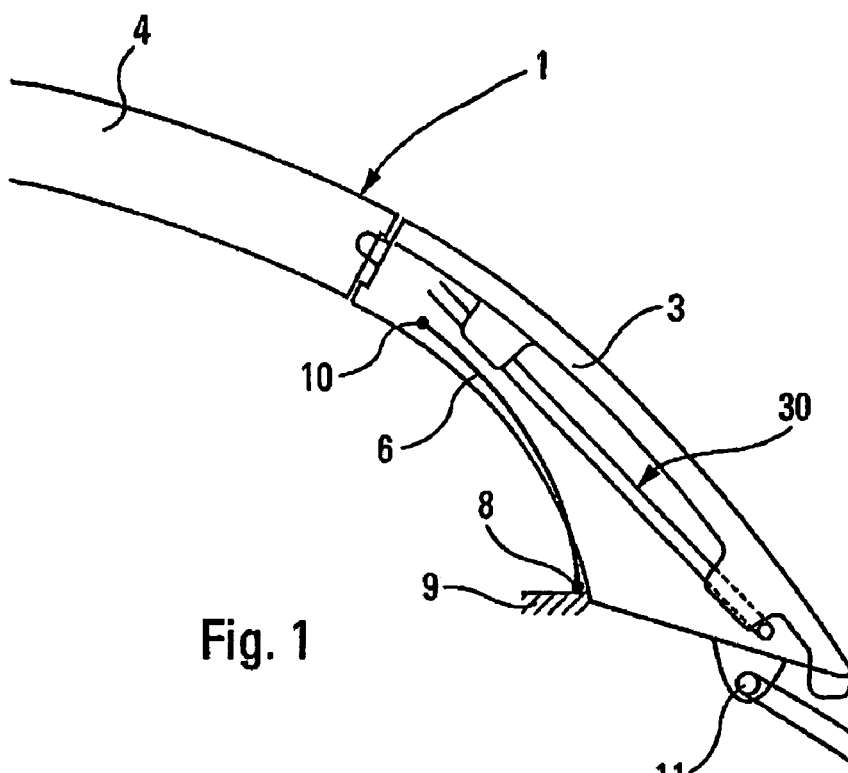
FIG. 1 is a diagrammatic cross section according to the longitudinal direction of a vehicle representing a collapsible roof in a deployed position.
Figure 2:
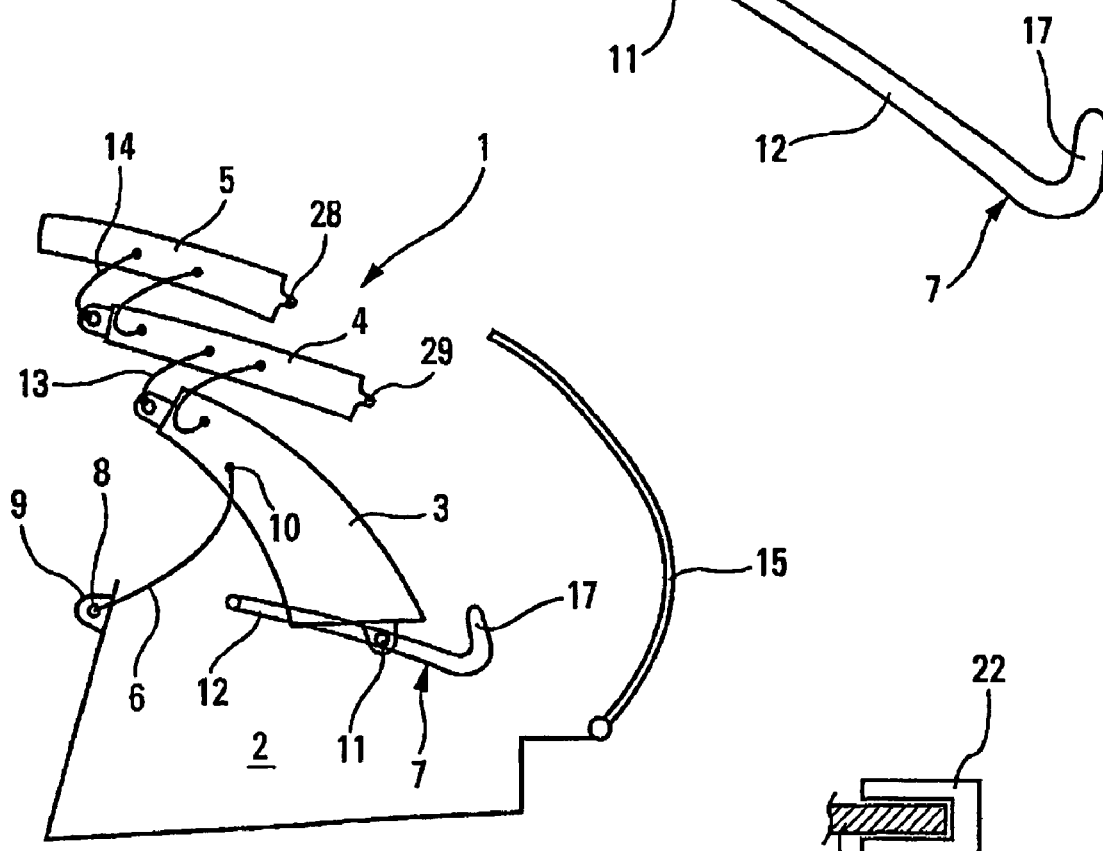
FIG. 2 is a similar view to that of FIG. 1, the roof being in the process of storing into the rear boot.
Figure 3:
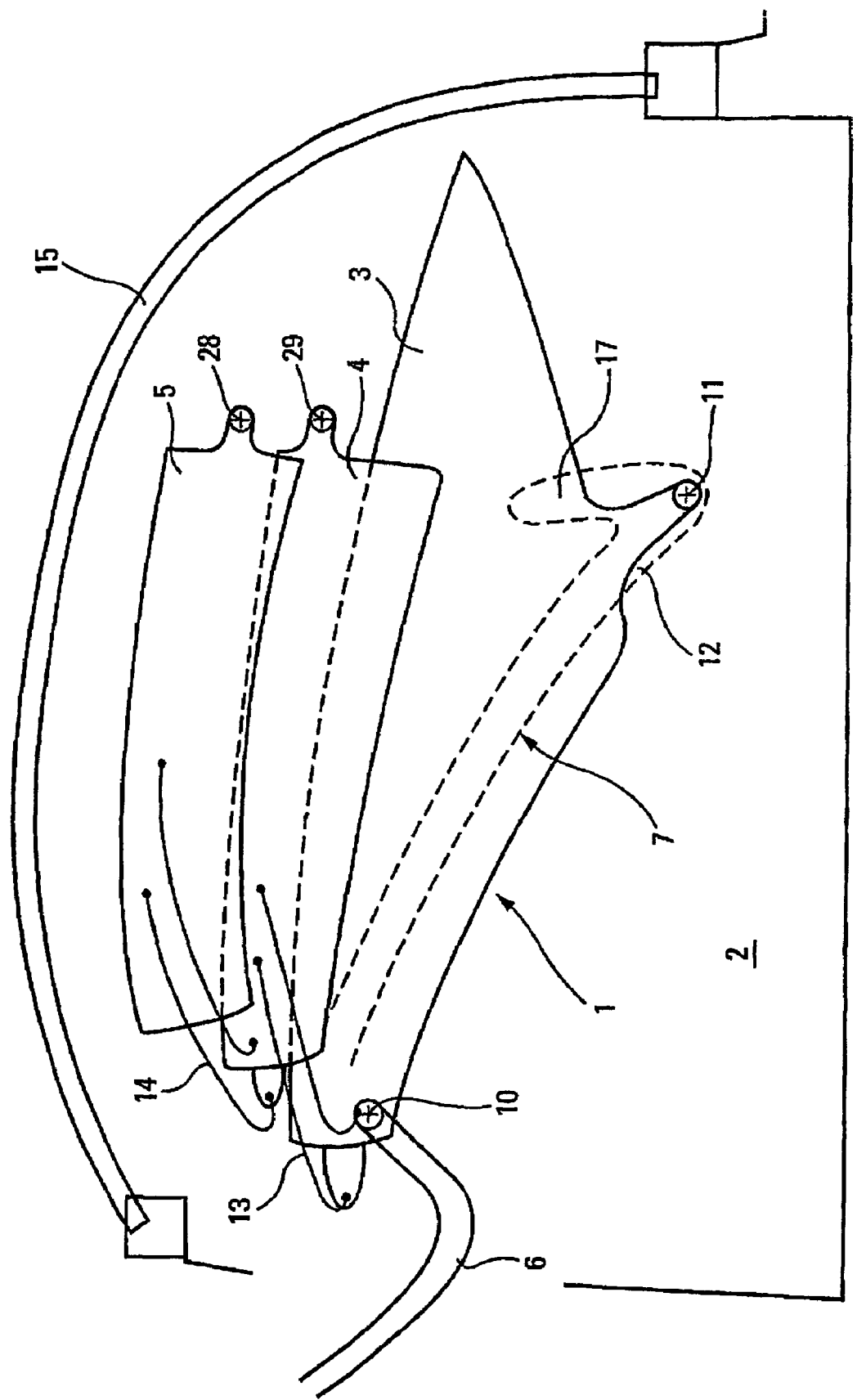
FIG. 3 is a blown-up view similar to those of FIGS. 1 and 2, the roof being in a folded, stored position in the rear boot, the raising device not showing.

FIGS. 1 to 3 demonstrate a collapsible roof 1 of a vehicle moving from its deployed position covering the passenger compartment of the vehicle to its folded, stored position in which it is stored into the rear boot 2 of the vehicle.

The roof 1 comprises a rear roof element 3, a central roof element 4 and a front roof element 5.

When the roof is in the deployed position, the front roof element 5 is in front of the central roof element 4 which itself is in front of the rear roof element 3. When the roof 1 is in the folded, stored position, the front roof element 5 is above the central roof element 4 which itself is above the rear roof element 3, the three roof elements 3, 4 and 5 thus being in a substantially horizontal position.

The folding (and unfolding) of the roof 1 is controlled by a deployment arm 6 and is guided by a guiding rail 7.

The deployment arm 6 comprises a first end through which it is swivel mounted around an axis of rotation 8 with the body 9 of the vehicle, and a second end through which it is swivel mounted around a hinge line 10 with the rear roof element 3.

The rear roof element 3 comprises a finger bar 11 slide mounted along the guiding rail 7 which is integral to the body 9 and which comprises a storage section 12 used to guide the roof 1 between its deployed position and its folded, stored position in which the roof 1 is retracted into the boot 2.

The storage section 12 and the deployment arm 6 allow to guide the rear roof element 3 directly between its deployed position and its folded, stored position.

Furthermore, the central roof element 4 is connected to the rear roof element 3 via rear link arms 13 which are actuated by first means for activating. Likewise, the front roof element 5 is connected to the central roof element 4 via front link arms 14 which are actuated by second means for activating. The first means for activating and the second means for activating operate under the control of the deployment arm 6.

The layout of the rear link arms 13 and the front link arms 14 and the means for activating actuating them, allows the central roof element 4 and the front roof element 5 to move from their deployed position to their folded, stored position in which the roof 1 is retracted into the boot 2.

Thus, the deployment arm allows to, directly or indirectly, guide the entire roof 1 between its deployed position and its folded, stored position.

FIG. 1 represents the roof 1 in the deployed position, the finger bar 11 being located on the upper front end of the storage section 12.

FIG. 2 represents the roof 1 between its deployed position and its folded, stored position, the hood 15 of the rear boot 2 being in its open position from front to rear in order to allow the roof 1 to be inserted into the boot 2.

FIG. 3 represents the roof 1 in its folded, stored position in the boot 2, the hood 15 being in its closed position and the finger bar 11 being located on the lower rear end of the storage section 12.

Figure 4:
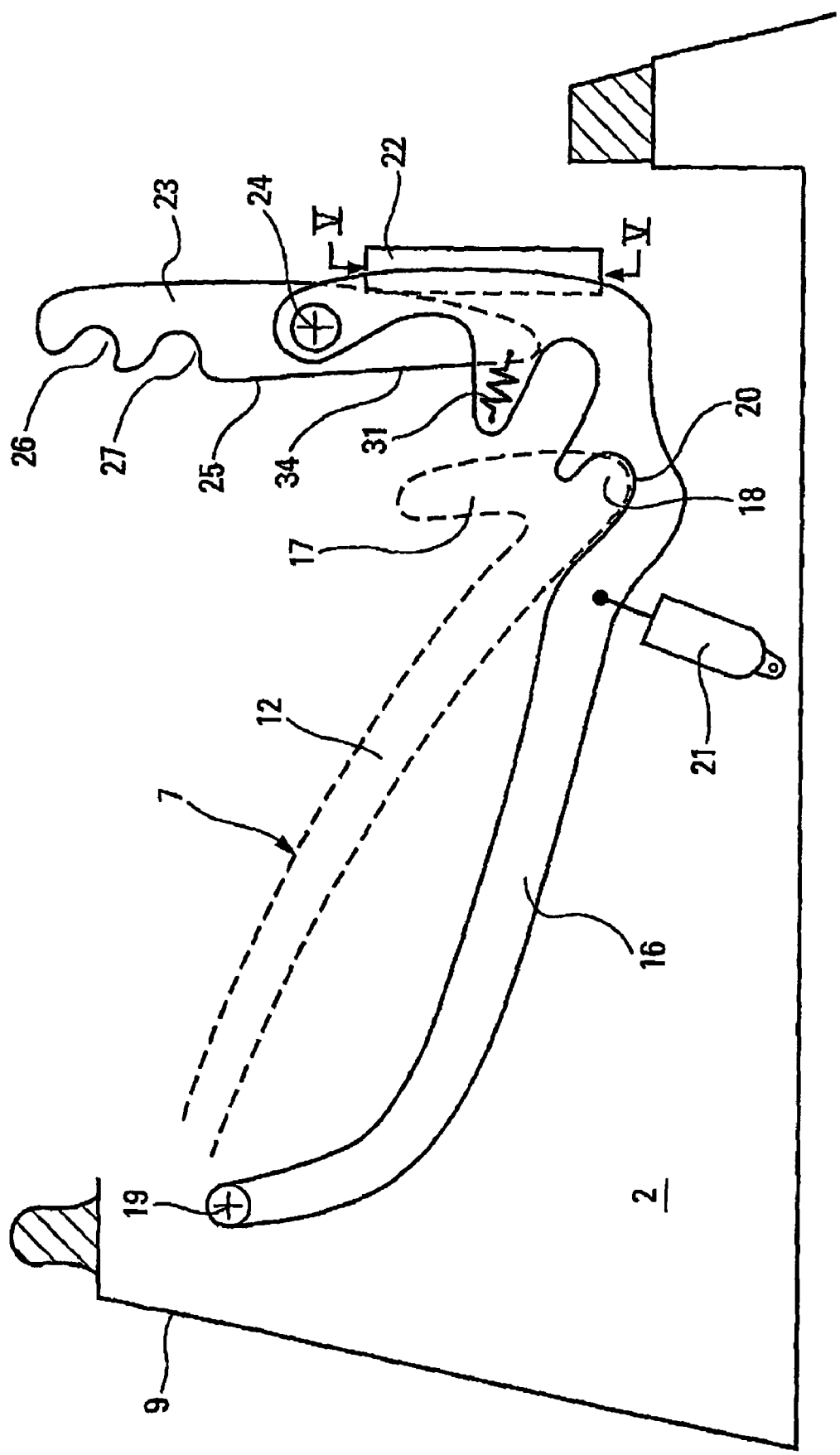
FIG. 4 is a similar view to that of FIG. 3, representing the guiding rail and the raising device according to the invention, the roof elements not showing.

FIG. 4 represents a device used to facilitate the inserting of objects under the roof 1 in the folded, stored position in the boot 2.

The device comprises a raising device 16 which is fitted in a moveable manner between a low position and a high position and which is used to guide the roof 1 between its folded, stored position and its folded, raised position in which the roof 1 partially projects out of the boot 2, the hood 15 thus being in the open position. The raising device 16 is in the low position when the roof 1 is in its folded, stored position and in the high position when the roof 1 is in its folded, raised position.

In order to guide the roof 1 between its folded, stored position and its folded, raised position, the guiding rail 7 comprises a raising section 17. This raising section 17 prolongs the storage section 12 and comprises a lower front end 18 which is the lower rear end of the storage section 12 and an upper rear end. The raising device 16 is used to guide the finger bar 11 along the raising section 17.

As can be seen in FIG. 4, the raising device 16 is a raising arm 16 which comprises a first end through which it is swivel mounted, around a swivel axis 19 transversal to the vehicle, to the body 9.

The raising arm 16 comprises a support element 20 which is located, when the raising arm 16 is in the low position, at a right angle to the lower front end 18 of the raising section 17. This support element 20 thus allows to support and guide the finger bar 11 along the raising section 17.

A jack 21 fitted in a movable manner on one hand to the body 9, and on the other hand to the raising arm 16, allows the raising arm 16 to move from its low position to its high position, and allows the folded roof 1 which lies on the raising arm 16 by means of the finger bar 11 supported by the support element 20, to move from its folded, stored position to its folded, raised position.

Due to the circular movement of the rear roof element 3, the raising section 17 is an arc whose centre is the hinge line 10.

Figure 5:
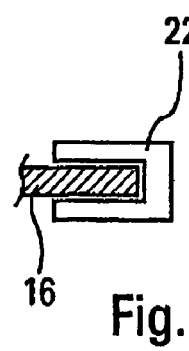
FIG. 5 is a cross section following the straight line V-V in FIG. 4.

As can be seen in FIG. 5, the radial end of the raising arm 17 is guided by a groove 22 integral to the body 9 so as to prevent the radial end of the raising arm from deviating from the direction of the swivel axis 19.

As can be seen in FIG. 4, and according to the invention, a securing means 23 is fitted onto the raising device 16 in a movable manner between an open position and a closed position.

In the closed position, the securing means 23 is used to support the central roof element 4 and the front roof element 5 and immobilise them in relation to the rear roof element 3, when the folded roof 1 is guided between its folded, stored position and its folded raised position.

The securing means 23 is located to the rear and right next to the central roof element 4 and the front roof element 5 when the roof 1 is in the folded position. More precisely, the securing means 23 is fitted in a movable manner in rotation around an axis of rotation 24 which is transversal to the vehicle and which is located on the raising arm 16, close to the radial end of the raising arm 16 guided by the groove 22.

The securing means 23 comprises, on its front face 25 (that being on its face which faces the rear ends of the central roof element 4 and of the front roof element 5), two recesses 26 and 27. The recess 26 is used to receive, in the closed position, a stub 28 which is integral to the front roof element 5, and the recess 27 is used to receive, in the closed position, a stub 29 which is integral to the central roof element 4.

Means for controlling 30 are used to bring the securing means 23 into contact and to guide it between its open position and its closed position. In the example illustrated in FIGS. 1 to 11, these means for controlling 30 are used to guide the securing means 23 from its open position to its closed position, means for returning 31 constantly bearing on the securing means 23 in the direction of its open position.

As can be seen in FIG. 4, the means for returning 31 comprise a spring 31 of which a first end is fixed to the securing means 23 and of which the second end is fixed to the raising device 16.

As can be seen in FIG. 1, the means for controlling 30 are placed on the rear roof element 3.

Figure 6:
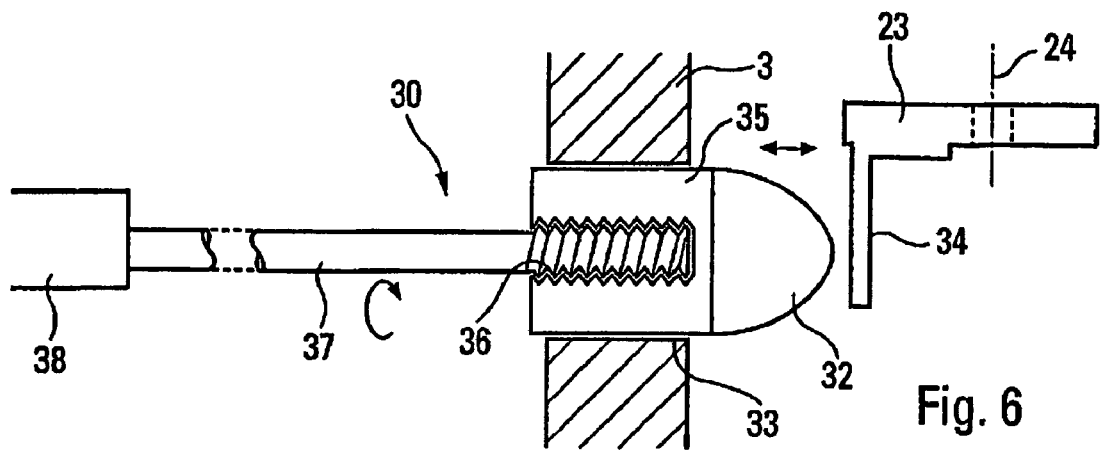
FIG. 6 is a top, cross section view of the means for controlling in the normal position following the straight line V-V in FIG. 8.
Figure 7:
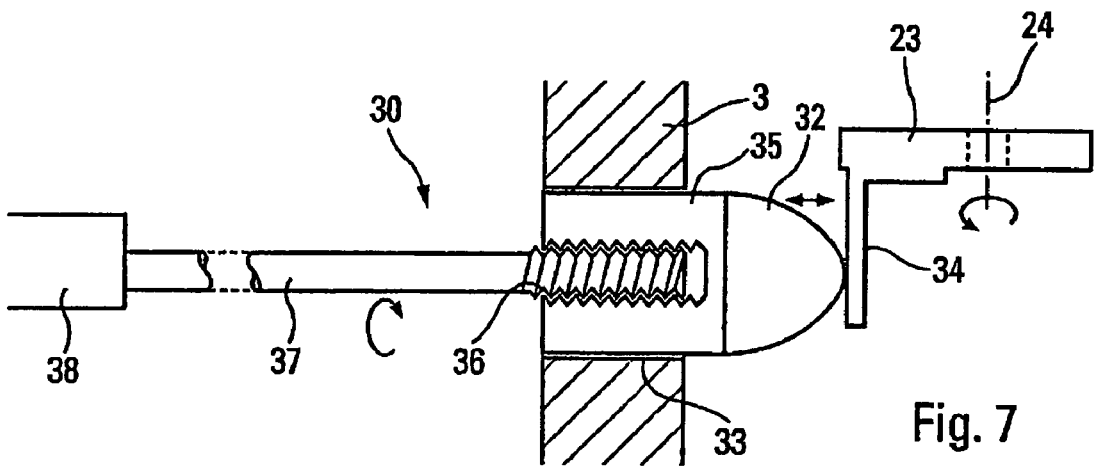
FIG. 7 is a similar view to that of FIG. 6, the means for controlling being in a locking position.

As can be seen in FIGS. 6 and 7, the means for controlling 30 comprise a push button 32. This push button 32 is mounted so as to be movable in a straight line with a guide 33 which is integral to the rear roof element 3. The push button 32 is movable between a normal position (see FIG. 6) and a stop position (see FIG. 7) in which the securing means 23 is in the closed position.

Whilst moving, from its normal position to its stop position, the push button 32 moves from a contact position at which point it comes into contact with a contact surface 34 located on the front face 25 of the securing means 23. The axis of rotation 24 being located between the contact surface 34 and the recesses 26 and 27, when the push button 32 continues its movement, from its contact position to its stop position, it guides the securing means 23 in rotation around the axis of rotation 24 until it is in the closed position in which the stubs 28 and 29 are inserted into the recesses 26 and 27.

In order to actuate the displacement of the push button 32 in the guide 33, a nut 35, integral to the push button 32, is used to co-operate with a threaded end 36 of an arm 37 fitted in rotation in relation to the rear roof element 3. The end of the arm 37 opposite the threaded end 36 is integral to a motor 38 fixed to the rear roof element 3, which allows to guide the push button 32 in a straight line according to the direction of the arm 37.

Figure 8:
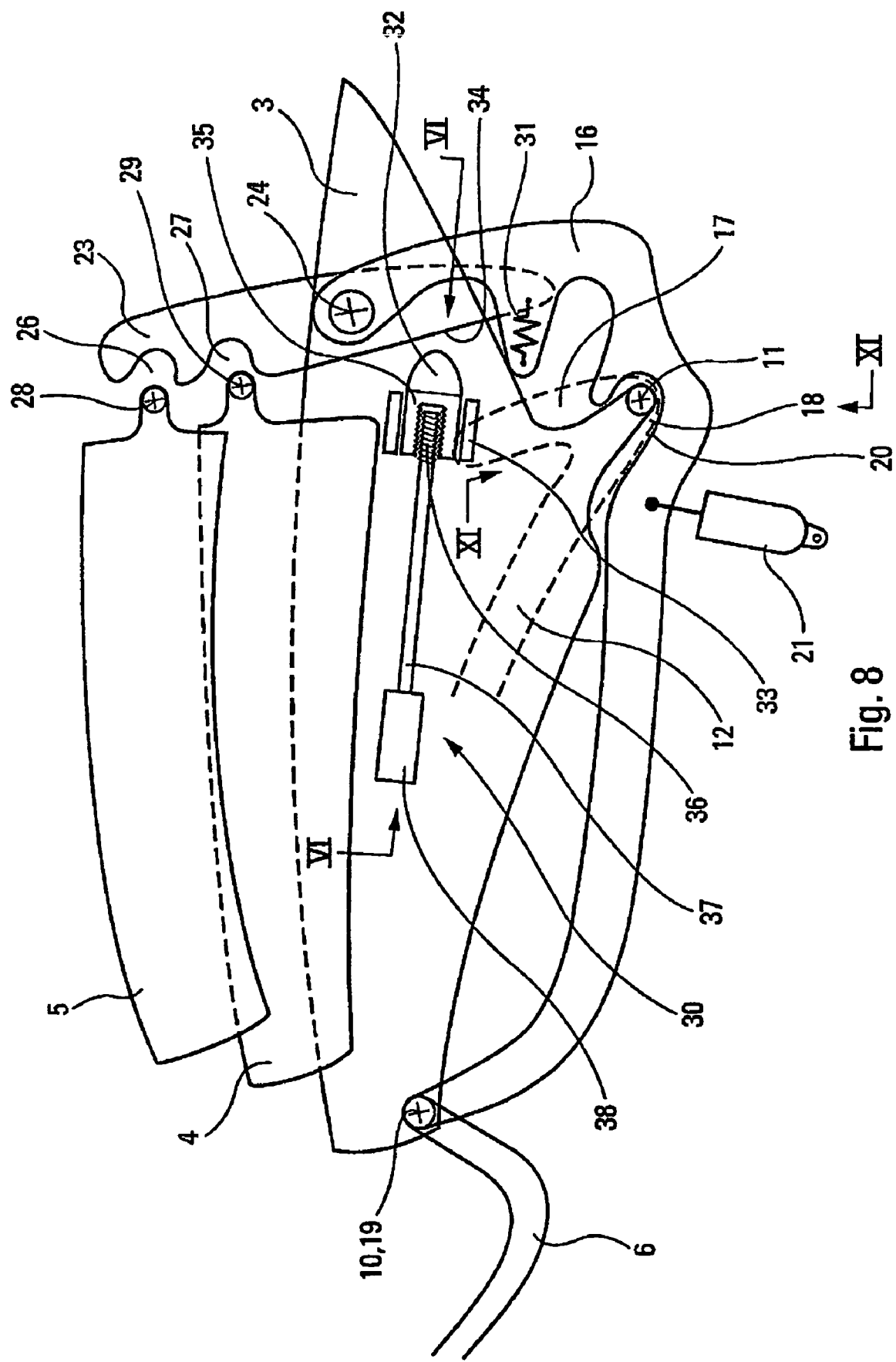
FIG. 8 is a similar view to those of FIGS. 3 and 4, the roof elements and the raising device being represented, the roof being in the folded, stored position and the securing means being in the open position.
Figure 9:
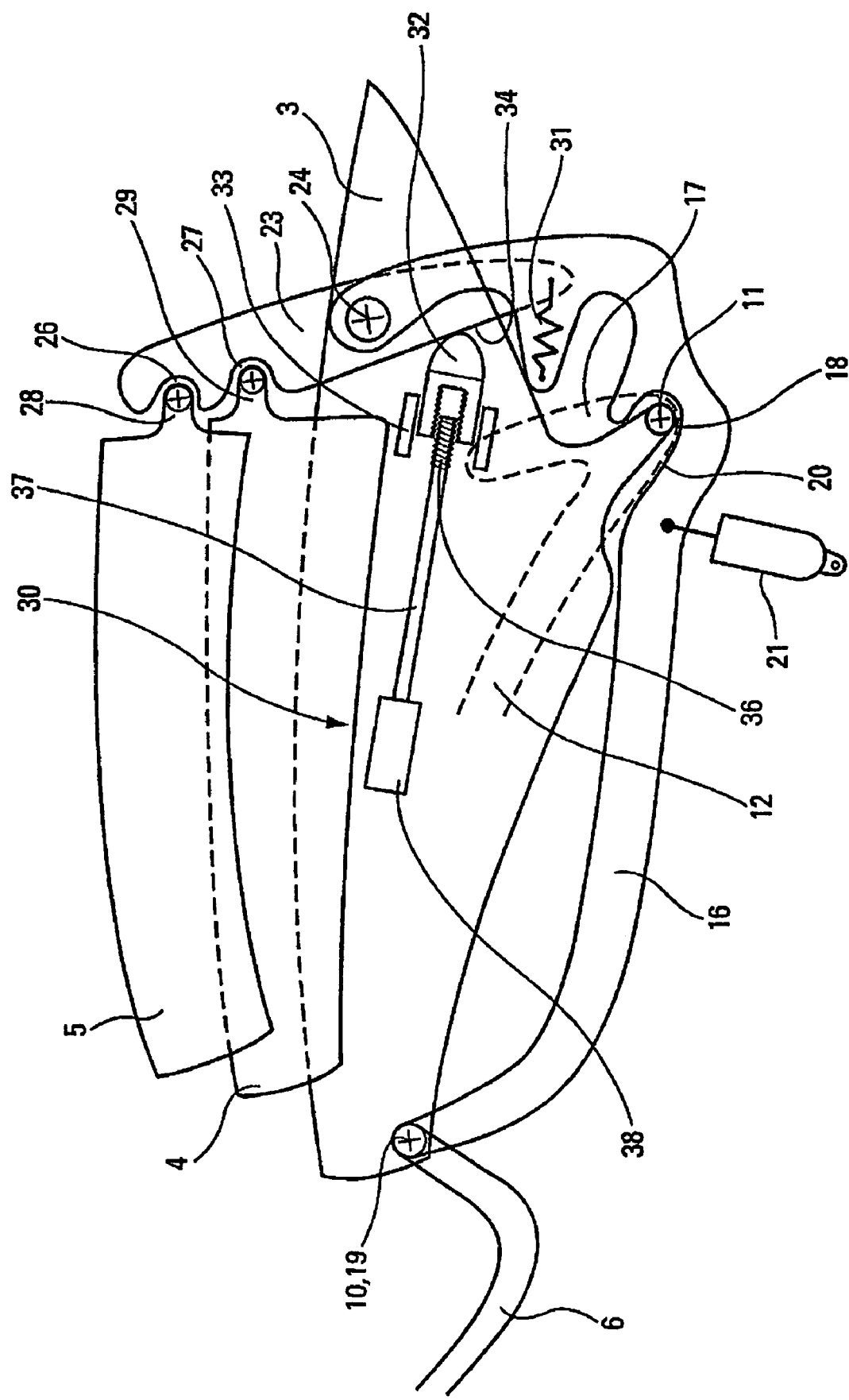
FIG. 9 is a similar view to that of FIG. 8, the roof being in the folded, stored position and the securing means being in the closed position.
Figure 10:
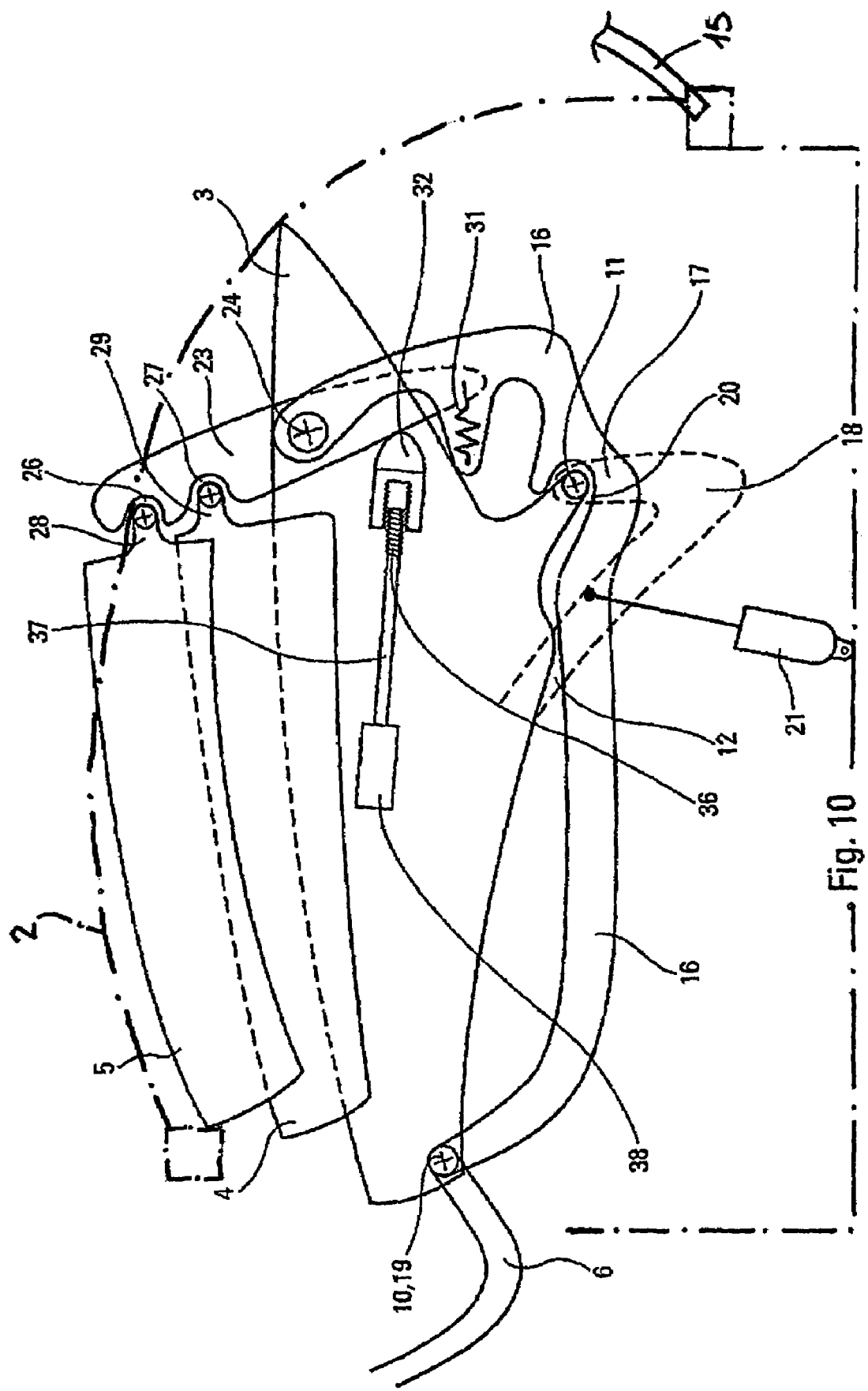
FIG. 10 is a similar view to those of FIGS. 8 and 9, the roof being in the folded, raised position and the securing means being in the closed position.

FIGS. 8 to 10 illustrate the operating of the device used to facilitate the inserting of objects under the roof 1 folded in the boot 2 following the opening command of the hood 15 from the rear to the front.

In FIG. 8, the roof 1 is in its folded, stored position, the finger bar 11 is in the lower front end 18 of the raising section 17 of the guiding rail 7, the raising arm 16 is in its low position, the securing means 23 is in its open position under the effect of the return spring 31, and the push button 32 is in its normal position.

As soon as the roof is in its folded, stored position, the motor 38 is actuated and guides in rotation the arm 37. The rotating of the threaded end 36 of the arm 37 drives the nut 35 and the push button 32 in a straight line, their rotation being hindered by the guide 33. Thus, the push button 32 moves from its normal position to its contact position, and from its contact position, it engenders through its displacement towards its stop position, the rotation of the securing means 23 around the axis of rotation 24, from its open position to its closed position in which the recesses 26 and 27 retain the stubs 28 and 29.

FIG. 9 illustrates this step in which the roof 1 is in its folded, stored position, the finger bar 11 is in the lower front end 18 of the raising section 17 of the guiding rail 7, the raising arm 16 is in its low position, and the securing means 23 is in its closed position under the effect of the push button 32 which is in its stop position.

Thus, the central roof element 4 and the front roof element 5 become fixed as soon as they are stored in the rear boot 2, which avoids any off-setting of the additional roof elements 4 and 5 and the putting of them off-centre following a brutal movement of the vehicle (for example passing over a speed control bump or mounting a kerb).

Following the actuating of the command for opening the hood 15 from the rear towards the front, and in order to render the rear boot zone 2 located under the folded roof 1 accessible, the jack 21 is actuated, which guides the rotation of the raising arm 16 around the swivel axis 19 from its low position to its high position. The finger bar 11, supported by the support element 20, slides along the raising section 17. Thus, the roof 1 moves from its folded, stored position to its folded, raised position 1, as illustrated in FIG. 10.

Figure 11:
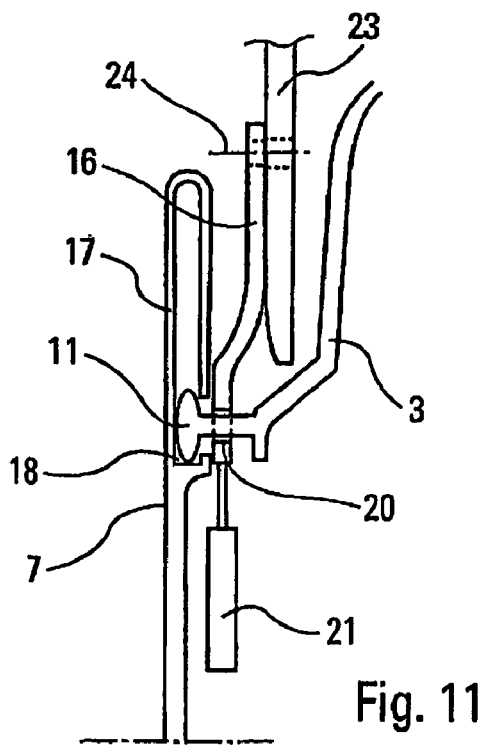
FIG. 11 is a cross section following the straight line XI-XI in FIG. 8.
Figure 16:
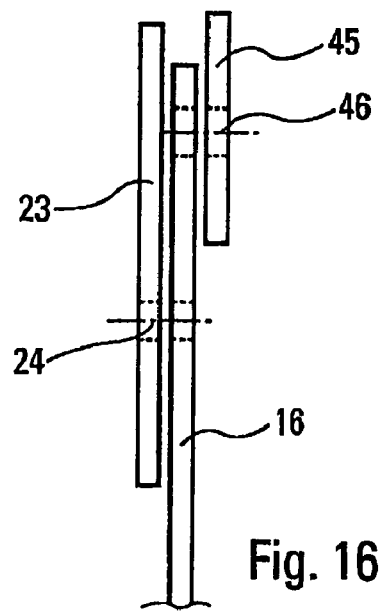
FIG. 16 is a cross section view following the straight line XVI-XVI in FIG. 15.

FIG. 11 demonstrates the finger bar 11 of the rear roof element 3 inserted in the lower front end 18 of the raising section 17 and supported by the support element 20 of the raising arm 16.

FIGS. 12 to 16 illustrate two specific embodiments: the device comprises, for each additional roof element 4 and 5, a bearing surface 44 and 43 which is used to support the corresponding additional roof element 4 and 5 when the securing means 23 is in the open position and the roof 1 is in the folded, stored position.

Figure 12:
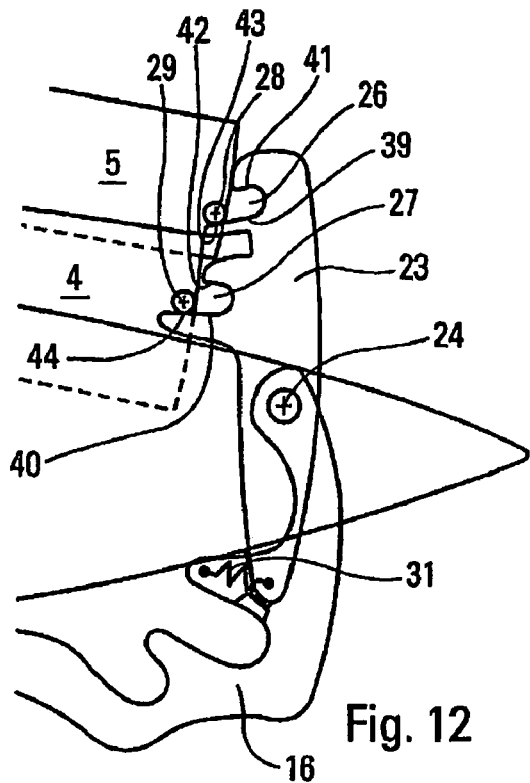
FIG. 12 is a cross section similar to that of FIG. 8 of a second embodiment of the invention.

FIG. 12 illustrates the first specific embodiment: the securing means 23 is used to support the central roof element 4 and the rear roof element 5 as much when it is in the closed position as in the open position.

Each recess 26 and 27 of the securing means 23 is delimited by a lower side wall 39 and 40 and an upper side wall 41 and 42 between which the corresponding stubs 28 and 29 are inserted when the securing means 23 is in the closed position.

According to this embodiment, for each recess 26 and 27, the lower side wall 39 and 40 projects forward past the corresponding upper side wall 41 and 42 so as to create the corresponding bearing surface 43 and 44: each bearing surface 43 and 44 is used to receive, when the securing means 23 is in the open position and the roof 1 is in the folded, stored position, the stub 28 and 29 which is used to be inserted into the corresponding recess 26 and 27 when the securing means 23 is in the closed position.

Of course, the central roof element 4 and the front roof element 5 are laid out so that, when the roof 1 is close to its folded, stored position, the stub 29 of the central roof element 4 is located further forward than the stub 28 of the front roof element 5. In this way, the stub 29 of the central roof element 4 which is located under the stub 28 of the front roof element 5, does not push against the bearing surface 43 used to receive the stub 28 of the front roof element 5 during the folding of the roof 1.

In order to restrict, to the greatest extent, the displacement of the central and front roof elements 4 and 5 in relation to the rear roof element 3 when the securing means 23 moves from its open position to its closed position, the bearing surfaces 43 and 44 are preferably in the shape of an arc whose centre is the axis of rotation 24.

FIGS. 13 to 16 illustrate the second specific embodiment: all the bearing surfaces 43 and 44 are located on a support element 45.

The support element 45 is fitted to the raising device 16 in a movable manner between an admission position (see FIG. 13) and a reception position (see FIGS. 14 and 15) in which each bearing surface 44 and 43 is used to support the corresponding additional roof element 4 and 5 when the roof 1 is in the folded, stored position.

As can be seen in FIGS. 13 to 16, the support element 45 is, in relation to the raising device 16, fitted in a movable manner in rotation around an axis of inclination 46 which is transversal to the vehicle and which is located in retreat of the additional roof elements 4 and 5 when the roof 1 is in the folded position.

The support element 45 comprises a lower leg 47 and an upper leg 48 fixed to each other, each being used to respectively create the bearing surface 44 of the central roof element 4 and that 43 of the front roof element 5, when the support element 45 is in the reception position.

Means for activating 49 are used to bring into contact the support element 45 and to guide it from its admission position to its reception position. In the example illustrated in FIGS. 13 to 15 these means for activating 49 are used to guide the support element 45 from its admission position towards its reception position, means for returning 50 constantly bearing on the support element 45 in the direction of its admission position.

Figure 15:
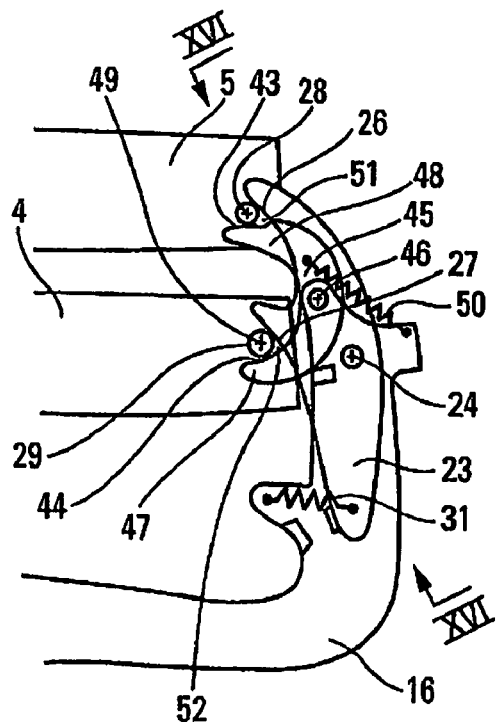
FIG. 15 is a similar view to that of FIG. 9 of the third embodiment.

As can be seen in FIG. 15, the means for returning 50 comprise a spring 50 of which a first end is fixed to the support element 45 and of which the second end is fixed to the raising device 16.

Figure 13:
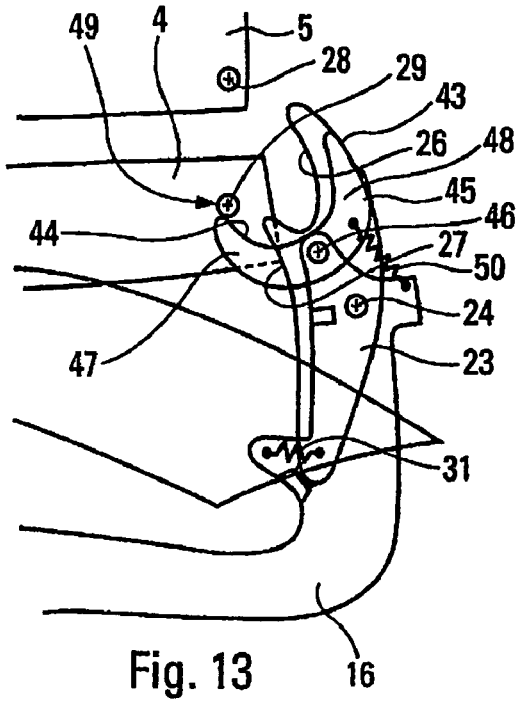
FIG. 13 is a cross section similar to those of FIGS. 8 and 12 of a third embodiment, the roof being in the transmission position.
Figure 14:
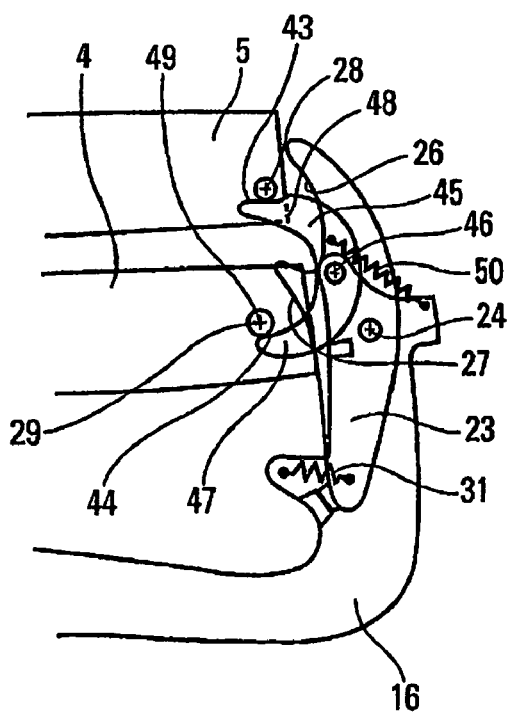
FIG. 14 is a similar view to those of FIGS. 8, 12 and 13 of the third embodiment, the roof being in the folded, stored position.

In the example illustrated in FIGS. 13 to 15, the means for activating 49 are constituted of the stub 29 of the central roof element 4.

When the roof 1 is guided from its deployed position to its folded, stored position, it passes through a transmission position adjacent to its folded, stored position and in which the stub 29 comes into contact with the lower leg 47 (see FIG. 13).

When the roof 1 is between its deployed position and its transmission position, the support element 45 is in the admission position under the effect of the spring 50.

From this transmission position, the stub 29 of the central roof element 4 guides the support element 45 until its reaches its reception position in which the roof 1 is in its folded, stored position.

When the roof 1 is in the folded, stored position, the securing means 23 is in the closed position and the support element 45 is in the reception position, each stub 28 and 29 is inserted into a cavity 51 and 52.

Each cavity 51 and 52 is created by the corresponding bearing surface 43 and 44 of the support element 45 and the corresponding recess 26 and 27 of the securing means 23.

Of course, the central roof element 4, the front roof element 5 and the support element 45 are laid out so that, when the roof 1 is close to its transmission position, the stub 29 of the central roof element 4 does not come into contact with the upper leg 48.

In this example, the support element 45 is in the admission position, the upper leg 48 is the leg furthest away from the roof 1: it is principally oriented upwards and slightly forwards and is located in retreat of the lower leg 47 which is oriented upwards and forwards. Thus the stub 29 of the central roof element 4 only comes into contact with the lower leg 47.

This embodiment is particularly beneficial when the central roof element 4 and the front roof element 5 are laid out so that, when the roof 1 is close to is transmission position, the stub 29 of the central roof element 4 is located further back than the stub 28 of the front roof element 5. Whereas, in the embodiment illustrated in FIG. 12, the stub 29 of the central roof element 4 pushes against the bearing surface 43 used to receive the stub 28 of the front roof element 5, according to the embodiment illustrated in FIGS. 13 to 16, the upper leg 48 (creating the bearing surface 43 used to receive the stub 28 of the front roof element 5) is in a position out of the reach of any of the roof 1 elements (the upper leg 48 is located alongside the securing means 23 when it is in the open position).

Figure 17:
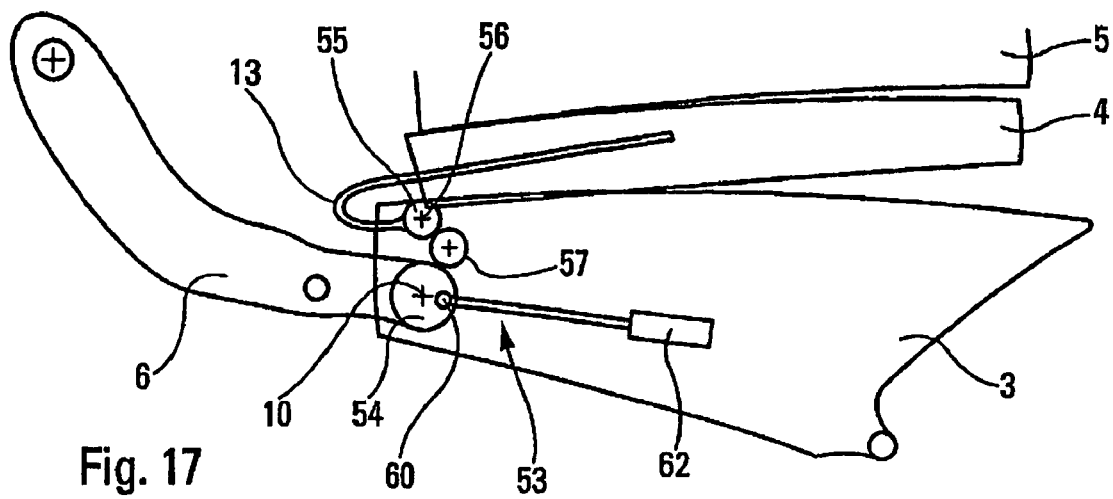
FIG. 17 is a similar view to that of FIG. 3, demonstrating a disengaging gear mechanism.
Figure 18:
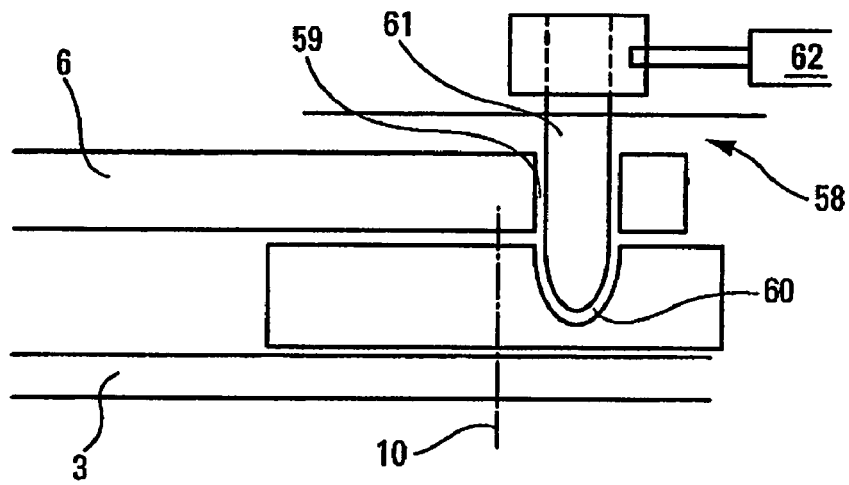
FIG. 18 is a cross section following the straight line XVIII-XVIII in FIG. 17 of the gear mechanism in the engaged position.
Figure 19:
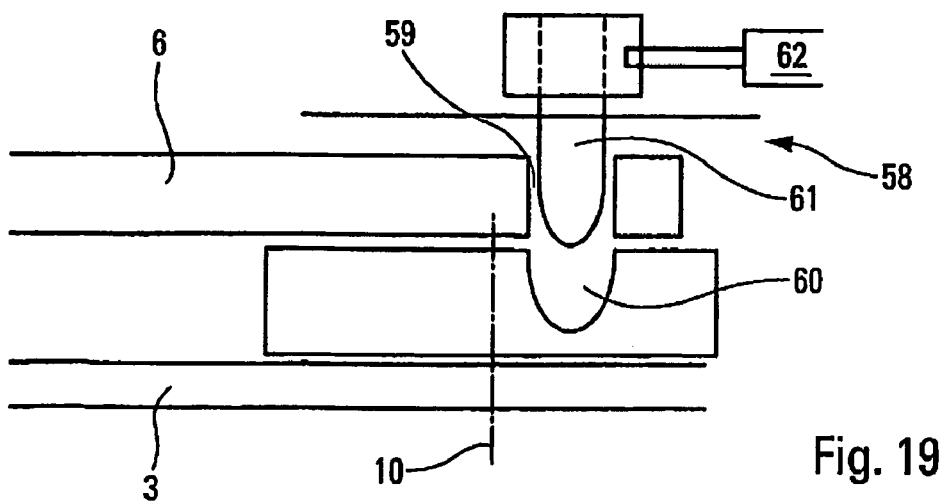
FIG. 19 is a similar view to that of FIG. 18, the gear mechanism being in the disengaged position.

In the example illustrated in FIGS. 17 to 19, the first means for activating is a gearing mechanism 53 connecting the rear link arms 13 to the deployment arm 6 so as to control the movement of the central roof element 4 with the swivelling of the rear roof element 3 in relation to the deployment arm 6 when the roof 1 is guided by the deployment arm 6 between its deployed position and its folded, stored position.

More precisely, the gearing mechanism 53 comprises an upstream sprocket 54 which is fixed to the end of the deployment arm 6 and which is rotary mounted to the rear roof element 3 around a hinge line 10, a downstream sprocket 55 which is fixed to the end of a rear link arm 13 adjacent to the rear roof element 3 and which is rotary mounted to the rear roof element 3 around an axis of transmission 56, and a central sprocket 57 which is rotary mounted to the rear roof element 3 and which is driven by the upstream sprocket 54 and the downstream sprocket 55.

Thus, when the roof 1 is guided between its deployed position and its folded, stored position, the deployment arm 6 swivels in relation to the rear roof element 3, and consequently, the upstream sprocket 54 drives, by means of the central sprocket 57, the downstream sprocket 55 in rotation around the axis of transmission 56 and the central roof element 4 in relation to the rear roof element 3.

So as to avoid displacing the central roof element 4 (and the front roof element 5), when the roof 1 moves from its folded, stored position to its folded, raised position caused by the rotating of the rear roof element 3 around the hinge line 10, a disengaging mechanism 58 is used to disengage the deployment arm 6 from the gearing mechanism 53: the end of the deployment arm 6 adjacent to the hinge line 10 comprises an orifice 59 and the upstream sprocket 54 comprises a complementary orifice 60 which is located at a right angle to the orifice 59 of the deployment arm 6 when the roof 1 is in the folded, stored position.

A retaining pin 61 is fitted in a movable manner into the orifice 59 and the complementary orifice 60 between an engaged position and a disengaged position.

In the engaged position, the retaining pin 61 penetrates into the orifice 59 and the complementary orifice 60 so as to secure the upstream sprocket 54 to the deployment arm 6, in the disengaged position, the retaining pin 61 is not in the complementary orifice 60. The retaining pin 61 is in the engaged position when the roof 1 is guided between its folded, stored position and its deployed position, and it is in its disengaged position when the roof 1 is guided between its folded, stored position and its folded, raised position. The retaining pin 61 is fitted in a straight line perpendicular to the vehicle, and it is driven by a motor 62.

When the deployment arm 6 and the upstream sprocket 54 are not secured together, the roof 1 can move from its folded, stored position to its folded, raised position, without any mechanical stresses in the gearing mechanism 53.

Furthermore, when the deployment arm 6 is no longer secured to the upstream sprocket 54, the deployment arm 6 is only attached to the axis of rotation 8. Moreover, it is advantageous to have a second disengaging mechanism used to secure the deployment arm 6 to the body 9 at its end adjacent to the hinge line 10 when it is not secured to the upstream sprocket 54.

Furthermore, so as to avoid creating stress during the displacement of the roof 1 between its folded, stored position and its folded, raised position, the hinge line 10 and the swivel axis 19 are coaxial (when the roof is in its folded position).

Of course, the invention is not restricted to the embodiment described in detail in relation to FIGS. 1 to 11.

For example, the securing means 23 could be of a different structure, which also goes for the means for controlling 30 and the means for returning 31.

Likewise, it is possible to have a device in which the hinge line 10 and the swivel axis are not coaxial. In this regard, to avoid any mechanical stress, the recesses used to secure the stubs should be properly shaped so as to provide the additional roof elements 4 and 5 some freedom of movement in relation to the securing means 23.

It is also possible that the first means for activating are independent from the deployment arm 6, that being mechanically independent: in this regard, the first means for activating could be a motor. Of course, mechanically speaking, the means for activating mean the displacing of the central roof element 4 in relation to the rear roof element 3 dependent on the displacing of the rear roof element 3.

The invention claimed is:

1. A device adapted to facilitate the inserting of objects under a folded roof stored in a rear boot of a motor vehicle, the vehicle comprising a body, a passenger compartment, a hood adapted to move between a closed position closing the rear boot and an open position opening said boot, the roof being movable between a deployed position in which it covers the passenger compartment, and a folded, stored position in which the roof is stored into the boot, the roof comprising a rear roof element and at least one additional roof element-which is located in front of the rear roof element when the roof is in the deployed position, and above the rear roof element when the roof is in the folded, stored position, the rear roof element comprising a finger bar adapted to slide along a guiding rail which is fixed to the body of the vehicle and which comprises a storage section used to guide the roof between its deployed position and the folded, stored position, and a raising section extending along the storage section and adapted to guide the folded roof between its folded, stored position and a folded, raised position in which, the hood of the rear boot being in the open position, the folded roof at least partially projects out of the boot, the device comprising a raising device mounted in a movable manner between a low position and a high position, and adapted to guide the finger bar along the raising section, wherein a securing means is fitted to the raising device in a movable manner between an open position and a closed position in which the securing means is adapted to support and to immobilize said at least one additional roof element with respect to the rear roof element, when the roof is moved between its folded, stored position and its folded, raised position.

2. The device set forth in claim 1, wherein the securing means is located behind and in the immediate vicinity of the additional roof element when the roof is in the folded, raised position.

3. The device set forth in claim 1, wherein the securing means is rotary mounted with respect to the raising device, around a transverse axis of rotation and located behind said at least one additional roof element when the roof is in the folded, stored position.

4. The device set forth in claim 1, wherein a groove integral to the body is used to guide an end of the raising arm adjacent to the securing means.

5. The device set forth in claim 1, wherein said at least one additional roof element comprises a plurality of additional roof elements, and the securing means has a front face including, for each additional roof element, a recess adapted to receive, in the closed position, a stub which is integral to the corresponding additional roof element.

6. The device set forth in claim 5, wherein it comprises, for each additional roof element, a bearing surface adapted to support the corresponding additional roof element when the securing means is in the open position and the roof is in the folded, stored position.

7. The device set forth in claim 6, wherein:
each recess is delimited by an upper side wall and by a lower side wall which projects forward past the upper side wall and which defines the corresponding bearing surface;
the additional roof elements comprise a central roof element and a front roof element which is located in front of the central roof element when the roof is in the deployed position, and above the central roof element when the roof is in the folded, stored position;
stubs are integral to the central roof element and the front roof element respectively; and
the additional roof elements are arranged so that, when the roof is close to its folded, stored position, the stub of the central roof element is located further forward than the stub of the front roof element so as not to push against the bearing surface of the stub of the front roof element.

8. The device set forth in claim 6, wherein all the bearing surfaces are located on a support element which is fitted to the raising device in a movable manner between an admission position and a reception position in which each bearing surface is adapted to support the corresponding additional roof element when the roof is in the folded, stored position.

9. The device set forth in claim 8, wherein:
the additional roof elements comprise a central roof element and a front roof element which is located in front of the central roof element when the roof is in the deployed position, and above the central roof element when the roof is in the folded position; and
the support element comprises a lower leg and an upper leg fixed to each other, each being adapted to respectively define the bearing surface of the central roof element and that of the front roof element, when the support element is in the reception position.

10. The device set forth in claim 8, wherein:
the additional roof elements comprise a central roof element and a front roof element which is located in front of the central roof element when the roof is in the deployed position;
the support element comprises a lower leg and an upper leg fixed to each other;
activating means are used to bring into contact the support element and to guide it from its admission position to its reception position; and,
said activating means comprise the stub of the central roof element which is used to bring into contact the lower leg when the support element is in the admission position and when the roof, whilst folding, is in an intermediate position adjacent to its folded, stored position, and to guide the support element until it reaches its reception position when the roof moves from its intermediate position to its folded, stored position.

11. The device set forth in claim 8, wherein, when the roof is in the folded, stored position, the securing means is in the closed position and the support element is in the reception position, stubs are inserted into cavities respectively defined by the corresponding bearing surface of the support element and the corresponding recess of the securing means.

12. The device set forth in claim 1, wherein controlling means are used to bring the securing means into contact therewith and to guide it from its open position and its closed position.

13. The device set forth in claim 12, wherein:

the controlling means are disposed on the rear roof element; and the controlling means comprise a push button mounted so as to be movable in a straight line with a guide fixed to the rear roof element, between a normal position and a stop position in which the securing means is in the closed position, said push button being adapted to come into contact with a contact surface located on a front face of the securing means.

14. The device set forth in claim 5, wherein:

the securing means is rotary mounted with respect to the raising device, around a transverse axis of rotation and located behind said plurality of additional roof elements when the roof is in the folded, stored position; and the axis of rotation is located between the contact surface and the recesses.

15. The device set forth in 1, wherein:

folding and unfolding the roof is controlled by at least one deployment arm and guided by at least one guiding rail; and said at least one deployment arm is connected to rear link arm linking the rear roof element to the adjacent, additional roof element, by means of a gearing mechanism and in that a disengaging mechanism is used to disengage the deployment arm from the gearing mechanism.

16. The device set forth in claim 15, wherein the gearing mechanism comprises an upstream sprocket which is fixed to an end of the deployment arm and which is rotary mounted to the rear roof element around a hinge line, a downstream sprocket which is fixed to an end of a rear link arm by which the rear roof element is linked to the additional roof element adjacent to it, and which is rotary mounted to the rear roof element around an axis of transmission, and a central sprocket which is rotary mounted to the rear roof element and which is driven by the upstream sprocket and the downstream sprocket.

17. The device set forth in claim 1, wherein folding and unfolding the roof is controlled by at least one deployment arm and guided by at least one guiding rail, and, a hinge line around which the rear roof element is fitted in a movable maimer to said at least one deployment arm guiding the roof between its deployed, stored position and its folded position and the swivel axis around which the raising device is fitted in a movable manner to the body of the vehicle are coaxial when the roof is in its folded, stored position.

18. The device set forth in claim 13, wherein a nut fixed to the push button is used to engage a threaded end of a rotative arm extended along a direction, so as to guide the push button in a straight line according to the direction of extension of the arm.

19. The device set forth in claim 18, wherein an end of the arm opposite the threaded end is fixed to a motor attached to the rear roof element.

\* \* \* \* \*